Patented Mar. 9, 1937

2,073,031

UNITED STATES PATENT OFFICE

2,073,031

ESTERS OF OCTADECANEDIOL

Caryl Sly, Wilmington, Del., assignor to E. I. du Pont de Nemours & Company, Wilmington, Del., a corporation of Delaware No Drawing. Application May 3, 1935,
Serial No. 19,668

14 Claims. (Cl. 260—103)

This invention relates to new compositions of matter, more particularly to esters of octadecanediol and still more particularly to polycarboxylic acid esters of octadecanediols and the formulation thereof in plasticized compositions particularly with cellulose derivatives.

This invention has as an object the preparation of new esters of octadecanediols. A further object is the preparation of plasticized compositions containing such esters. Other objects will appear hereinafter.

These objects are accomplished by the following invention wherein an octadecanediol is reacted with a polycarboxylic acid, its anhydride, chloride or ester with a volatile alcohol under suitable conditions, the resulting products being isolated and where desired formulated into plastic compositions.

Polycarboxylic acid esters of octadecanediols may be prepared by reacting the octadecanediol with the polycarboxylic acid or one of the esterifying derivatives thereof mentioned above. In the processes of this invention, a pure octadecanediol may be used or a crude form may be employed which is obtained by the method described in copending application, Serial No. 584,576, filed January 2, 1932. There may be used any polycarboxylic acid including aliphatic acids, such as succinic, adipic, azelaic, sebacic, tartaric, malic, maleic, fumaric; aromatic acids such as phthalic, hydroaromatic acids such as hexahydrophthalic, tetrahydronaphthalene - dicarboxylic, etc. In some cases only one hydroxyl of the octadecanediol is esterified with the polycarboxylic acid, the other hydroxyl being esterified with a monocarboxylic acid such as acetic, propionic, isobutyric, levulinic, lactic, benzoic, benzoylbenzoic, cycloparaffinic, hexahydrobenzoic, and similar acids. In still other cases each hydroxyl of the octadecanediol may be esterified with one carboxyl of a polycarboxylic acid and the remaining carboxyl groups of the polycarboxylic acid esterified with other alcohols such as aliphatic alcohols from methyl to octadecyl, ether alcohols such as methoxyethanol, cyclic alcohols such as cyclohexanol or aromatic alcohols such as benzyl alcohol. The following examples are given to illustrate the preparation of some of the specific compounds included in the scope of the present invention:

*Example 1.—Bis 12-hydroxy octadecyl phthalate*

A mixture containing 220 grams phthalic anhydride, 951 grams 1,12-octadecanediol (hydroxyl number 354), and 300 grams ethylene dichloride was refluxed at 130° to 190° C. for 18 hours under an apparatus designed to continuously remove the water as fast as it is formed. The acid number of the final product was 4.5 and the product was solid at room temperature.

*Example 2.—Bis 12-acetyloxyoctadecyl phthalate*

A mixture containing the product produced in Example 1 and 360 grams acetic anhydride was refluxed 4½ hours at 125° to 130° C. Twenty grams decolorizing carbon was then added, the acetic acid and the acetic anhydride distilled off under vacuum and the final product steamed and dried under vacuum at 150° to 200° C. After filtering to remove the carbon, the resulting product was a light brown liquid with an acid number of 2.5. This product may be further decolorized by treatment with oxidizing agents such as hydrogen peroxide, ozone, or aqueous permanganate solution.

*Example 3.—Methyl octadecanediol phthalate*

A mixture containing 660 grams dimethyl phthalate, 539 grams 1,12-octadecanediol (hydroxyl number 354), 30 grams litharge, and 500 cc. toluene was refluxed for 27 hours at 140° to 160° C. while continuously drawing off the methyl alcohol—toluene binary at the top of a distilling column. After the theoretical amount of methanol had been removed the product was filtered, 10 grams decolorizing carbon added, and the toluene distilled off under vacuum. The product was finally steamed and dried at 150° C. After filtration the remaining product was an amber colored viscous liquid.

*Example 4.—Octadecanediol phthalate*

A mixture containing 793 grams (2.5 mols) 1,12-octadecanediol, 485 grams (2.5 mols) methyl phthalate, 25 grams litharge, and 500 grams toluene was heated to boiling under a fractionating column for 45 hours during which time the toluene—methanol binary was being continuously removed. The product was cooled to 0° and filtered to remove excess octadecanediol and the litharge. The product was then heated to boiling under vacuum to remove the toluene and finally steamed and dried at 160° to 200° C. The finished product was a yellow, viscous liquid.

*Example 5.—12-acetyloxyoctadecyl methyl phthalate*

A mixture containing 485 grams (2½ mols) methyl phthalate, 793 grams (2½ mols) 1,12-octadecanediol, 30 grams litharge, and 500 grams toluene was heated to boiling under a fractionating column for 50 hours during which time the methanol—toluene binary was drawn off as fast as it was formed. The methanol removed during this time was equivalent to slightly more than one methyl group per mol. of phthalate. The product was filtered to remove the litharge then treated with 205 grams acetic anhydride and refluxed for 3 hours at 125° to 130° C. Twenty grams decolorizing carbon was then added, the volatile material removed by distillation under vacuum, and the product steamed and dried at 150° C. under vacuum. Filtration to remove the carbon yielded a light yellow liquid. Acetyloxyoctadecyl butyl phthalate may be prepared in a similar manner from butyl phthalate.

*Example 6.—Octadecanediol adipate*

A mixture containing 220 grams (1.25 mols) methyl adipate, 400 grams (1.25 mols) 1,12-octadecanediol, 15 grams litharge, and 200 grams toluene was refluxed under a fractionating column for 12 hours removing the toluol—methanol binary as formed. The product was filtered and treated with decolorizing carbon and the toluene removed by distillation under vacuum, followed by steaming and drying at 150° to 170° C. The product was a viscous, colored liquid.

Any of the polycarboxylic acids mentioned above or their esters may be substituted for the phthalic anhydride or methyl phthalate or adipate of the above examples. Any monocarboxylic acid including those mentioned above may be substituted for the acetic acid and anhydride in the above examples.

1,12-octadecanediol represents a much preferred starting material in the practice of the present invention. This material is readily prepared from ricinoleic acid or its esters, particularly the glyceride, which occurs to a very large extent in castor oil, by the methods of Lazier application 584,576, filed January 2, 1932. According to the process described in said application, ricinoleic acid derivatives, particularly castor oil, are transformed to octadecanediol by passage under a pressure of at least 10 atmospheres and preferably between 100–250 atmospheres and at high temperature, for example, at least 200° C. and preferably between 300 and 400° C. with an excess of hydrogen, for example, 2–10 mols per mol. of ricinoleic acid or derivative and at a rate of 2–8 mols of ricinoleic acid or derivative per volume of catalyst per hour over suitable catalysts, such as a mixture prepared by dissolving 245 gms. of crystallized zinc nitrate, 23 parts of hydrated cadmium nitrate and 24 parts of copper nitrate trihydrate in 750 parts of water, precipitating the same with an equal volume of water containing 126 parts of ammonium bichromate and 75 parts of 28% ammonium hydroxide, neutralizing exactly with additional ammonium hydroxide, washing several times by decantation, filtering, drying and igniting at 400° C. with or without reduction with hydrogen before utilization. Other suitable catalysts include such metals as finely divided copper, cadmium or zinc, and such hydrogenating-dehydrogenating oxides as zinc oxide and manganese oxide. Catalysts of the type including chromite or oxide of one or more hydrogenating metals whose oxides are difficultly reducible, including silver, cadmium, copper, lead, mercury, tin, bismuth, iron, cobalt and nickel, together with a chromite of a hydrogenating metal whose oxide is difficultly reducible such as magnesium, zinc and manganese have been found suitable.

The hydrogenation when applied to castor oil results in the carboxyl reduction and double bond saturation, thus giving 1,12-octadecanediol.

However, the invention also is applicable to and includes within its scope the employment of other octadecanediols, regardless of the position of the hydroxyl groups. A particularly desirable sub-class of octadecanediols is that containing one primary hydroxyl and one secondary hydroxyl. Such octadecanediols may be obtained from certain unsaturated fats and oils by carboxyl hydrogenation followed by addition of water to the double bond by various known methods. Octadecanediols having a primary and a secondary hydroxyl are preferred in this invention because they are more readily capable of being selectively esterified. Under proper conditions, as illustrated in certain of the above examples, it is possible to form a polycarboxylic acid ester thru reaction of the primary hydroxyl only, the secondary hydroxyl being subsequently esterified by very reactive esterifying derivatives of monocarboxylic acids, e. g., the anhydride or acid halide.

All of the esters prepared in the manner described above and exemplified in Examples 1 to 6 are substantially non-volatile and have been found to be satisfactory plasticizers for cellulose derivatives especially, and to a lesser extent natural and synthetic resins. They are readily soluble in ordinary organic solvents such as acetone or suitable mixtures of esters, alcohols, and hydrocarbons, e. g., toluol and alcohol, and are miscible with other materials commonly used as plasticizers. Their non-volatility results in a plasticized composition which retains its plasticity for long periods of time.

Thus the esters of the present invention may be employed with cellulose derivatives including cellulose esters, for example, the nitrate, isobutyrate, propionate butyrate, crotonate, and acetobutyrate, and cellulose ethers, for example, the crotyl cellulose, ethyl cellulose and benzyl cellulose, with or without resins such as dammar, pigments, fillers such as wood flour cellulose, etc. and drying and semi-drying oils, for example, castor oil. Likewise they may be used with resins such as phenol-formaldehyde, ether, polyvinyl acetate, and methyl methacrylate resins and resins produced by the condensation of ketones. They may be used for these purposes mixed with other plasticizers or as the sole plasticizer in any amount, i. e., 5, 10, 20, 30, 40, 60, 80, 100 and even 200 per cent based upon the derivative being modified.

The methods for the preparation of the esters of the present invention described above are capable of considerable variation and the invention is not limited to the specific methods described. For example, instead of the specific process of Example 3 an octadecanediol may be esterified with 2 mols phthalic anhydride and the remaining carboxyls esterified with methanol or other alcohols. As an alternate method to that described in Example 4, an octadecanediol may be esterified with phthalic anhydride or any other polybasic acid or anhydride. The following formula is indicative of the general type of compound included within the scope of the present invention:

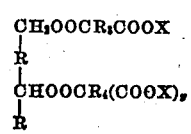

In this formula R and R₂ are straight chain hydrocarbon radicals, the former divalent and the latter monovalent, the sum of the carbon atoms in R and R₂ being 16, i. e., the original alcohol is an octadecanediol; R₃ is a divalent organic radical derived from a dicarboxylic acid by removal of the carboxyls thereof; R₄ is a hydrocarbon radical, the valence of which is y+1 and which is derived from a carboxy acid by the removal of the carboxyl or carboxyls thereof. X is either a monovalent radical derived from a monohydric alcohol such as methyl, butyl, decyl, dodecyl, octadecyl, methoxyethyl, cyclohexyl, benzyl, etc., or a divalent radical derived from an octadecanediol; and Y is 0 or 1. The preferred products are those in which R is decamethylene and R₂ is n-hexyl. As an example of the application of the above formula to the product of Example 5, R is decamethylene, R₂ is n-hexyl, R₃ is o-phenylene, Y is 0, R₄ is methyl, and X is methyl. The product of Example 5 is therefore represented by the formula:

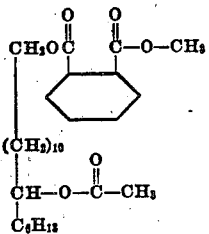

As indicated above the esters of the present invention are of very considerable utility as softeners or plasticizers, particularly for cellulose derivative compositions. These compositions are useful in lacquers and plastics and in the preparation of thin foils. They may be used in the preparation of all types of compositions containing cellulose derivatives or natural and synthetic resins, oils, pigments and filling materials. Specifically they may be employed in the preparation of enamels for coating metal, wood and paper, in dopes for coating fabrics, in moistureproof lacquers for coating regenerated cellulose, in plastic compositions for use in the preparation of toiletware, novelties, sheeting rods, tubes, safety glass interlayers, etc., and lacquers for coating wire screen and in the preparation of thin sheets for wrapping purposes.

This invention has an advantage in that it furnishes extremely high boiling water resistant plasticizers, and may be used in the preparation of extremely satisfactory plastic compositions and coating compositions when used with cellulose derivatives. Products produced thereby are substantially permanently flexible.

The above description and examples are intended to be illustrative only. Any modification of or variation therefrom which conforms to the spirit of the invention is intended to be included within the scope of the claims.

I claim:
1. An ester of 1,12-octadecanediol wherein at least one hydroxyl group is esterified by phthalic acid.
2. An ester of 1,12-octadecanediol wherein at least one hydroxyl group is esterified by a dicarboxylic acid.
3. An ester of 1,12-octadecanediol wherein at least one hydroxyl group is esterified by a polycarboxylic acid.
4. An ester of an octadecanediol having one primary and one secondary hydroxyl group wherein at least one hydroxyl group is esterified by phthalic acid.
5. An ester of an octadecanediol having one primary and one secondary hydroxyl group wherein at least one hydroxyl group is esterified by a dicarboxylic acid.
6. An ester of an octadecanediol having one primary and one secondary hydroxyl group wherein at least one hydroxyl group is esterified by a polycarboxylic acid.
7. A process which comprises reacting an octadecanediol having one primary and one secondary hydroxyl with a member of the class consisting of polycarboxylic acids, esters thereof with volatile alcohols, chlorides thereof and anhydrides thereof.
8. A process which comprises reacting an octadecanediol having one primary and one secondary hydroxyl with phthalic acid.
9. A process which comprises reacting 1,12-octadecanediol with a member of the class consisting of polycarboxylic acids, esters thereof with volatile alcohols, chlorides thereof and anhydrides thereof.
10. A process which comprises reacting 1,12-octadecanediol with phthalic acid.
11. Bis-12-hydroxyoctadecyl phthalate.
12. An ester of 1,12-octadecanediol wherein the primary hydroxyl group is esterified by a polycarboxylic acid and the other hydroxyl group is esterified by a monocarboxylic acid.
13. 12-acetyloxyoctadecyl methyl phthalate.
14. Bis-12-acetyloxyoctadecyl phthalate.

CARYL SLY.

Certificate of Correction

Patent No. 2,073,031.   March 9, 1937.

CARYL SLY

It is hereby certified that error appears in the printed specification of the above numbered patent requiring correction as follows: Page 2, second column, lines 70 to 75 inclusive, for the formula read $$\begin{array}{c} CH_2OOCR_3COOX \\ | \\ R \\ | \\ CHOOCR_4(COOX)_y \\ | \\ R_2 \end{array}$$

and that the said Letters Patent should be read with this correction therein that the same may conform to the record of the case in the Patent Office.

Signed and sealed this 11th day of May, A. D. 1937.

[SEAL]

HENRY VAN ARSDALE,
*Acting Commissioner of Patents.*